F. HAAS.
MANOMETER.
APPLICATION FILED MAY 14, 1913.
1,107,298.
Patented Aug. 18, 1914.
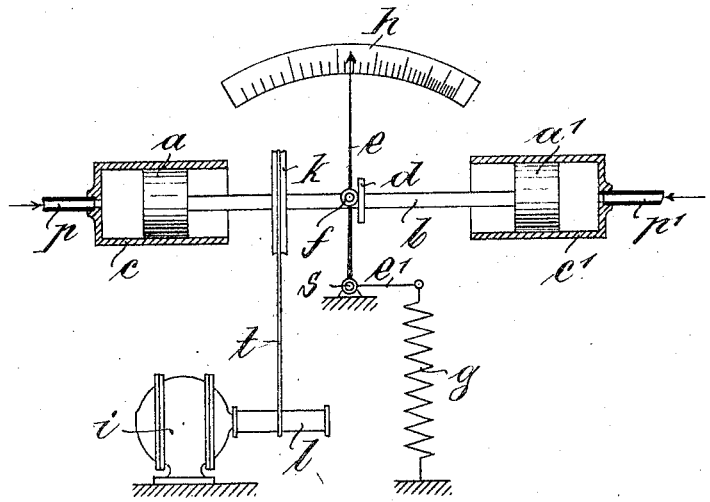
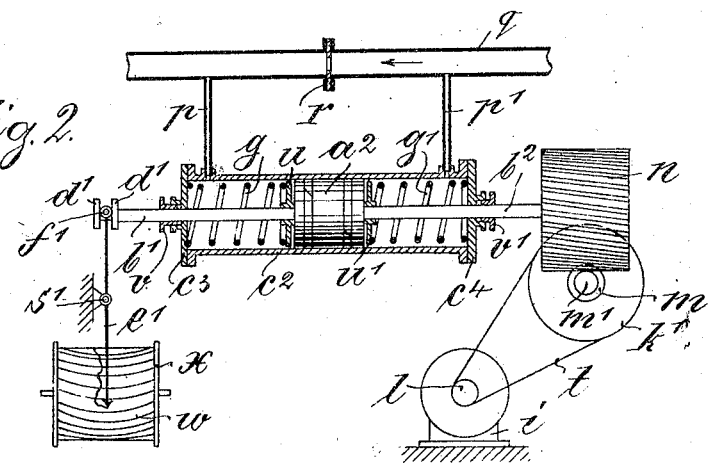
Witnesses:
Charles E. Crompton
John T. Heins
Inventor
Fritz Haas
by G. Croydon Marks
Attorney

UNITED STATES PATENT OFFICE.

FRITZ HAAS, OF QUEDLINBURG, GERMANY.

MANOMETER.

1,107,298.

Specification of Letters Patent.

Patented Aug. 18, 1914.

Application filed May 14, 1913. Serial No. 767,670.

*To all whom it may concern:*

Be it known that I, FRITZ HAAS, subject of the King of Prussia, residing at Quedlinburg, in the German Empire, have invented certain new and useful Improvements in Manometers, of which the following is a specification.

This invention relates to differential manometers for use in measuring the quantity of steam or other pressure fluid passing through a conduit, and relates to that type of manometer adapted to register the difference in pressure on both sides of a throttling device, such as a flange or the like, within the fluid conduit, the difference in pressure enabling the quantity of fluid passing through the conduit to be ascertained.

Hitherto, in order to register the difference in pressure on both sides of the throttling device, it has been proposed to cause the steam on both sides of the throttling device to act upon the opposite faces of a piston or compound piston working within a corresponding cylinder or cylinders to which the steam is supplied, the piston being connected to an index or recording device so as to indicate or record the difference in pressure upon a suitable dial or recording instrument. This device has, however, the objectionable feature that, owing to the friction between the piston and the cylinder and owing to the friction between the piston rod and its stuffing box, when a stuffing box is provided, the indicating mechanism connected to the piston does not respond readily enough to the variations in pressure.

The present invention has for its object to overcome the aforesaid disadvantage and for this purpose the piston or compound piston is constantly rotated or given a constant partial rotation or rocking motion about its axis, thus overcoming the friction of the parts.

In order that the invention may be more clearly understood reference is made to the accompanying drawings showing two different forms of my invention by way of example, Figure 1 being a diagrammatic view partly in section showing a manometer having a compound piston, while Fig. 2 is a similar view also partly in section showing a manometer having a single piston.

Referring to Fig. 1 of the drawings: $a$ and $a^1$ designate pistons connected together by a piston rod $b$ so as to form a compound piston, the piston heads $a$ and $a^1$ working within corresponding cylinders $c$ and $c^1$ respectively, to which steam or other fluid under pressure is supplied by way of pipes $p$ and $p^1$ respectively, said pipes being connected to the steam or other fluid conduit $q$ (illustrated in Fig. 2) and opening thereinto on both sides of the internal flange $r$ or other throttling device. The movements of the compound piston due to the variation in pressure on both sides of the throttling device $r$ are transmitted by means of a collar $d$ on the piston rod $b$ to a roller $f$ mounted upon the index $e$ which is pivoted at $s$, the roller $f$ being held in contact with the collar $d$ by means of a spring $g$ fixed to a stationary part at one end and to an arm $e^1$ projecting at right angles to the index $e$ which moves over a suitable scale $h$ which may be graduated to indicate the quantity of fluid passing through the conduit $q$ corresponding to the difference in pressure on both sides of the throttling device $r$.

In order to overcome the friction between the piston heads $a$, $a^1$ and the cylinders $c$ and $c^1$ respectively, the piston rod $b$ is rotated according to the present invention by means of an electro-motor $i$ or other suitable source of power adapted to rotate a pulley $l$ over which is trained a band $t$ passing around a grooved pulley $k$ fixed upon the piston rod $b$. The pulley $l$ is of such width that the band $t$ is capable of moving along it in conformity with the reciprocating movements of the piston rod $b$.

Referring now to Fig. 2 of the drawings: A single piston $a^2$ works within a corresponding cylinder $c^2$, the fluid being supplied to the opposite sides of the piston by way of the pipes $p$ and $p^1$ in the manner already described with reference to Fig. 1. Interposed between the cylinder covers $c^3$ and $c^4$ and the piston $a^2$ are springs $g$ and $g^1$ respectively bearing at one end against the cylinder covers $c^3$ and $c^4$ and at their other ends either against the piston $a^2$ or, as illustrated, against disks $u$ and $u^1$ respectively fixed upon the piston rods $b^1$ and $b^2$ respectively which pass through suitable stuffing boxes $v$ and $v^1$ respectively. The piston rod $b^1$ carries a pair of collars $d^1$ between which engages a roller $f^1$ carried at one end of a double-armed lever $e^1$ pivoted at $s^1$ and adapted to record upon a suitable recording strip $w$ passing around a paper roll $x$. The piston $a^2$ is continuously rotated from the electromotor $i$ by means of a worm wheel $n$ mounted upon the piston rod $b^2$ and meshing with a worm $m$ on a shaft $m^1$ carrying a pulley $k^1$, the pulley $k^1$ being driven from the pulley $l$ of the electromotor $i$ by a band or rope $t$. The mechanism is such that the rotary motion will continue to be imparted to the piston $a^2$ during its reciprocating motion, the worm wheel $n$ being of sufficient breadth to engage with the worm $m$ when moved axially by the piston.

I claim—

1. In a device of the character described, a pressure gage comprising a cylinder to which the pressure fluid is supplied, a piston movable in said cylinder, a pressure recorder actuated by said piston, and power-driven mechanism for imparting rotary motion to said piston about its axis, said mechanism being capable of translation in accordance with the reciprocations of said piston within the cylinder.

2. In a device of the character described, a pressure gage comprising a cylinder to which the pressure fluid is supplied, a piston movable in said cylinder, a pressure recorder actuated by said piston, and power-driven mechanism for imparting an angular motion to said piston about its axis, said mechanism being capable of translation in accordance with the reciprocations of said piston within the cylinder.

3. In a device of the character described, a pressure gage comprising a cylinder, a piston therein, means for supplying the pressure fluid to said cylinder on both sides of said piston, and means for imparting a rotary motion to said piston about its axis, said means moving in conformity with the movement of said piston.

4. In a device of the character described, a pressure gage comprising a cylinder, a piston therein, means for supplying the pressure fluid to said cylinder on both sides of said piston, and means for imparting an angular motion to said piston about its axis, said means moving in conformity with the movement of said piston.

In testimony whereof I have affixed my signature in presence of two witnesses.

FRITZ HAAS.

Witnesses:
EMIL LIKMUND,
CHARLOTTE LIEBERT.